United States Patent
Oe et al.

(10) Patent No.: US 9,343,774 B2
(45) Date of Patent: May 17, 2016

(54) METHOD FOR PRODUCING A LITHIUM HEXAFLUOROPHOSPHATE CONCENTRATED LIQUID

(75) Inventors: Meguru Oe, Ube (JP); Keiji Sato, Ube (JP); Mitsuya Ohashi, Tokyo (JP); Toshinori Mitsui, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/703,588

(22) PCT Filed: Aug. 15, 2011

(86) PCT No.: PCT/JP2011/068499
§ 371 (c)(1),
(2), (4) Date: Dec. 11, 2012

(87) PCT Pub. No.: WO2012/023534
PCT Pub. Date: Feb. 23, 2012

(65) Prior Publication Data
US 2013/0143112 A1 Jun. 6, 2013

(30) Foreign Application Priority Data

Aug. 17, 2010 (JP) ................. 2010-182143
Jun. 10, 2011 (JP) ................. 2011-129681
Jul. 28, 2011 (JP) ................. 2011-165773

(51) Int. Cl.
| | | |
|---|---|---|
| C01D 15/00 | (2006.01) | |
| H01M 10/0563 | (2010.01) | |
| H01M 10/056 | (2010.01) | |
| H01M 10/052 | (2010.01) | |
| H01M 10/0568 | (2010.01) | |
| H01M 10/0569 | (2010.01) | |

(52) U.S. Cl.
CPC ........... *H01M 10/056* (2013.01); *C01D 15/005* (2013.01); *H01M 10/052* (2013.01); *H01M 10/0563* (2013.01); *H01M 10/0568* (2013.01); *H01M 10/0569* (2013.01); *Y02E 60/122* (2013.01); *Y02P 70/54* (2015.11)

(58) Field of Classification Search
CPC ....... C01B 25/10; C01B 25/00; C01D 15/005
USPC ............................. 71/301; 423/301
See application file for complete search history.

(56) References Cited

U.S. PATENT DOCUMENTS

| | | | |
|---|---|---|---|
| 5,866,093 A * | 2/1999 | Belt et al. ................. | 423/301 |
| 6,197,205 B1 | 3/2001 | Tsujioka et al. | |
| 6,387,340 B1 * | 5/2002 | Na et al. ................... | 423/301 |
| 8,771,882 B2 * | 7/2014 | Sato et al. ................ | 429/323 |
| 2007/0042271 A1 | 2/2007 | Nishida et al. | |
| 2008/0032194 A1 * | 2/2008 | Nakai et al. .............. | 429/218.1 |
| 2009/0311610 A1 | 12/2009 | Sato et al. | |
| 2010/0322838 A1 * | 12/2010 | Waki et al. ............... | 423/301 |
| 2011/0123873 A1 | 5/2011 | Nishida et al. | |
| 2011/0189538 A1 * | 8/2011 | Waki et al. ............... | 429/199 |

FOREIGN PATENT DOCUMENTS

| | | |
|---|---|---|
| DE | 198 05 356 C1 | 6/1999 |
| EP | 1 976 048 A1 | 10/2008 |
| EP | 2 581 980 A1 | 4/2013 |
| JP | 64-72901 A | 3/1989 |
| JP | 9-165210 A | 6/1997 |
| JP | 10-72207 A | 3/1998 |
| JP | 10-81505 A | 3/1998 |
| JP | 2007-184246 A | 7/2007 |
| WO | WO 2005/003108 A1 | 1/2005 |
| WO | WO 2005/042466 A1 | 5/2005 |
| WO | WO 2007/066464 A1 | 6/2007 |

OTHER PUBLICATIONS

Extended European Search Report dated Nov. 26, 2013 (seven (7) pages).
Corresponding International Search Report with English Translation dated Nov. 8, 2011 (five (5) pages).
Japanese-language Written Opinion dated Nov. 8, 2011 (PCT/ISA/237) (four (4) pages).
Kemmitt et al., "The Structural Chemistry of Complex Fluorides of General Formula", J. Chem. Soc. Part 4, (1963), (Six (6) pages).

* cited by examiner

*Primary Examiner* — Wayne Langel
(74) *Attorney, Agent, or Firm* — Crowell & Moring LLP

(57) ABSTRACT

Disclosed is a method for forming lithium hexafluorophosphate by reacting together phosphorus trichloride, chlorine and lithium chloride in a nonaqueous organic solvent and then making the reaction product formed in the solvent react with hydrogen fluoride. This method is characterized by that a lithium hexafluorophosphate concentrated liquid is obtained by conducting a filtration after making the reaction product formed in the solvent react with hydrogen fluoride and then subjecting the filtrate to a concentration by degassing. By this method, it is possible to easily produce a high-purity, lithium hexafluorophosphate concentrated liquid at a low cost.

8 Claims, No Drawings

METHOD FOR PRODUCING A LITHIUM HEXAFLUOROPHOSPHATE CONCENTRATED LIQUID

TECHNICAL FIELD

The present invention relates to a method for producing a lithium hexafluorophosphate concentrated liquid, and using the same an electrolyte solution for lithium ion batteries, which solution contains lithium hexafluorophosphate as the electrolyte, and lithium ion batteries.

BACKGROUND OF THE INVENTION

There have been proposed various methods for producing lithium hexafluorophosphate, which is an electrolyte useful for lithium ion batteries, etc. In methods for producing lithium hexafluorophosphate using a solvent, there is a method (Non-patent Publication 1) in which a gaseous phosphorus pentafluoride is reacted with lithium fluoride that is dissolved by using anhydrous hydrogen fluoride as a solvent, and then the resulting lithium hexafluorophosphate is crystallized and taken out.

In this method, reaction yield of lithium hexafluorophosphate is high. It is, however, necessary to use as a solvent a large amount of anhydrous hydrogen fluoride, which is high in vapor pressure and has toxicity and corrosiveness. Therefore, its handling is not easy. Furthermore, there are many factors leading to the increase of cost, such as the necessity of producing phosphorus pentafluoride as one of the raw materials in a separate process, the necessity of having a crystallization process of lithium hexafluorophosphate, etc.

In common electrolyte solution productions, there is conducted a method in which lithium hexafluorophosphate is firstly produced, and then it is dissolved in a predetermined solvent for lithium batteries to make an electrolyte solution. As to the method of producing lithium hexafluorophosphate, for example, there is a method (Patent Publication 1) in which a solid lithium fluoride is reacted with a gaseous phosphorus pentafluoride with no solvent. In this method, there is a risk in which a film of the reaction product is formed on the surface of lithium fluoride, thereby the reaction does not proceed completely, and the unreacted lithium fluoride remains.

Similarly, there is also a method (Patent Publication 2) in which a reaction is conducted by adding anhydrous hydrogen fluoride to phosphorus pentachloride and lithium fluoride with no solvent. In this method, it is not easy to control the reaction, and therefore it is necessary to conduct a cooling until tens of degrees Celsius below freezing point.

Furthermore, there is a method (Patent Publication 3) in which lithium fluoride is reacted with phosphorus pentafluoride in an organic solvent. This method has great advantages in terms of reaction control and purity of the reaction product. It is, however, necessary to produce and handle phosphorus pentafluoride as one of the raw materials in a separate process, as mentioned above. Therefore, a problem of the cost remains.

Furthermore, there is also a method of producing lithium hexafluorophosphate (Patent Publication 4) in which, while anhydrous hydrogen fluoride or a polar organic solvent of $CH_3CN$ is used as a solvent, phosphorus trichloride, chlorine and hydrogen fluoride are reacted together to obtain phosphorus pentafluoride, followed by adding lithium fluoride to the same reactor to conduct a reaction with phosphorus pentafluoride. This method is efficient since the production of phosphorus pentafluoride is also conducted in the same reactor. It, however, goes through the formation of phosphorus pentafluoride, which is high in vapor pressure. Therefore, it is necessary to have expensive facilities such as a pressurized reactor and complicated operations. Furthermore, it is basically necessary to have a crystallization process. Therefore, it is difficult to fundamentally lower the cost of the electrolyte solution production. In this way, there remain many problems.

On the other hand, there is a method (Patent Publication 5), in which phosphorus trichloride, chlorine and lithium chloride are reacted together in a nonaqueous organic solvent, and then the reaction product formed in the solvent is reacted with hydrogen fluoride to produce an electrolyte solution for lithium ion batteries. In this method, it is possible to obtain a high-purity, electrolyte solution for lithium ion batteries that contains lithium hexafluorophosphate as an electrolyte. In case that hydrogen fluoride becomes excessive, however, it becomes necessary to remove this. Therefore, lithium chloride is added again as a purifying agent to remove acid impurities containing excessive hydrogen fluoride. With this, it is possible to obtain a higher-purity, electrolyte solution for lithium ion batteries.

PRIOR ART PUBLICATIONS

Patent Publications

Patent Publication 1: Japanese Patent Application Publication Showa 64-72901.
Patent Publication 2: Japanese Patent Application Publication Heisei 10-72207.
Patent Publication 3: Japanese Patent Application Publication Heisei 9-165210.
Patent Publication 4: Japanese Patent Application Publication Heisei 10-81505.
Patent Publication 5: Japanese Patent Application Publication 2007-184246.

Non-Patent Publications

Non-patent Publication 1: J. Chem. Soc. Part 4, 4408 (1963).

SUMMARY OF THE INVENTION

In the method of the above-mentioned Patent Publication 5, in the case of adding again lithium chloride as a purifying agent, there is a possibility that a solid matter residue is newly generated. Furthermore, in order to achieve a higher purity, it becomes necessary to precisely add that in an amount equimolar with acid impurities containing hydrogen fluoride contained. Such precise addition is industrially difficult.

In a method of forming lithium hexafluorophosphate by reacting together phosphorus trichloride, chlorine, and lithium chloride in a nonaqueous organic solvent, and then making the reaction product formed in the solvent react with hydrogen fluoride, the present invention provides a method for easily producing a high-purity, lithium hexafluorophosphate concentrated liquid at a low cost and a method for producing an electrolyte solution for lithium ion batteries that contains lithium hexafluorophosphate as an electrolyte by using the same.

In view of such task, as a result of an eager study, the inventors have found that, in a method for forming lithium hexafluorophosphate by reacting together phosphorus trichloride, chlorine and lithium chloride in a nonaqueous organic solvent and then making the reaction product formed in the solvent react with hydrogen fluoride, it is possible to easily produce a high-purity, lithium hexafluorophosphate concentrated liquid by conducting a filtration after making the reaction product formed in the solvent react with hydrogen fluoride and then subjecting the filtrate to a concentration by degassing, even without adding lithium chloride again, thereby reaching the present invention.

That is, in a method for forming lithium hexafluorophosphate by reacting together phosphorus trichloride, chlorine and lithium chloride in a nonaqueous organic solvent and then making the reaction product formed in the solvent react with hydrogen fluoride, the present invention provides a method (first method) for producing a lithium hexafluorophosphate concentrated liquid, which is characterized by that a lithium hexafluorophosphate concentrated liquid is obtained by conducting a filtration after making the reaction product formed in the solvent react with hydrogen fluoride and then subjecting the filtrate to a concentration by degassing.

The first method may a method (second method) for producing a lithium hexafluorophosphate concentrated liquid, which is characterized by that the concentration by degassing is conducted by a degassing under reduced pressure.

The first or second method may a method (third method) for producing a lithium hexafluorophosphate concentrated liquid, which is characterized by that the nonaqueous organic solvent is a chain or cyclic carbonic acid ester, or an ether compound having at least two oxygen atoms.

The third method may be a method (fourth method) for producing a lithium hexafluorophosphate concentrated liquid, which is characterized by that the carbonic acid ester is at least one selected from the group consisting of dimethyl carbonate, diethyl carbonate, ethyl methyl carbonate, ethylene carbonate, and propylene carbonate.

The third method may be a method (fifth method) for producing a lithium hexafluorophosphate concentrated liquid, which is characterized by that the ether compound is 1,2-dimethoxyethane.

Furthermore, the present invention provides a method for producing an electrolyte solution for lithium ion batteries, containing lithium hexafluorophosphate as an electrolyte, which is characterized by that the lithium hexafluorophosphate concentrated liquid obtained by any one of the first to fifth methods is further subjected to at least one treatment selected from filtration, concentration, a dilution with a nonaqueous organic solvent, and addition of an additive.

In the above-mentioned method, the filtration conducted after making the reaction product, which has been formed by reacting together phosphorus trichloride, chlorine and lithium chloride in a nonaqueous organic solvent, react with hydrogen fluoride is conducted by a pressure filter, a vacuum filter or a filter press using a filter cloth or a cartridge filter, a sedimentation equipment by centrifugation, a filtration separator, a cross-flow filter using an ultrafiltration membrane, etc. Solid matter of the filtration residue is lithium fluoride. This substance can be used as a lithium source and a fluorine source when synthesizing a lithium hexafluorophosphate concentrated liquid of the next batch. In this case, lithium fluoride is consumed in place of lithium chloride when phosphorus trichloride, chlorine and lithium chloride are reacted together in a nonaqueous organic solvent, or is consumed in place of hydrogen fluoride when the reaction product formed by the above reaction is reacted with hydrogen fluoride.

The concentration by degassing is a method in which a gas phase portion containing the solvent by volatilization is discharged into the outside of the system by pressure reduction or allowing a carrier gas, such as nitrogen gas and dry air, to flow, thereby increasing the concentration of the solute. In the present invention, it has been found that concentration of the solute increases, and acid impurities together with the solvent are discharged by using the concentration by degassing. With this, it is considered that a high-purity lithium hexafluorophosphate concentrated liquid can be produced.

It is preferable that the concentration of acid impurities contained in the lithium hexafluorophosphate concentrated liquid is as low as possible. It is preferable that the concentration of acid impurities contained in the concentrated liquid obtained by the present invention is 60 mass ppm or less, more preferably 50 mass ppm or less. If this acid impurities concentration exceeds the above range, it causes adverse effects on the lithium battery characteristics. Therefore, it is not preferable.

Advantageous Effect of the Invention

In a method for forming lithium hexafluorophosphate by reacting together phosphorus trichloride, chlorine and lithium chloride in a nonaqueous organic solvent and then making the reaction product formed in the solvent react with hydrogen fluoride, it is possible by the present invention to easily produce a high-purity, lithium hexafluorophosphate concentrated liquid without adding lithium chloride again in order to further conduct a reaction with the unreacted hydrogen fluoride. It is a production method that is capable of obtaining a highly-purified concentrated liquid by conducting the concentration by degassing with no use of a purifying agent, and that is capable of conducting the production with a single reaction vessel, while not requiring a particularly complicated apparatus, and thereby capable of promoting the cost reduction.

DETAILED EXPLANATION

In a method for forming lithium hexafluorophosphate by reacting together phosphorus trichloride, chlorine and lithium chloride in a nonaqueous organic solvent and then making the reaction product formed in the solvent react with hydrogen fluoride, the present invention provides a method for producing a lithium hexafluorophosphate concentrated liquid, which is characterized by that a lithium hexafluorophosphate concentrated liquid is obtained by conducting a filtration after making the reaction product formed in the solvent react with hydrogen fluoride and then subjecting the filtrate to a concentration by degassing.

In the following, the present invention is explained in detail.

1. A Lithium Hexafluorophosphate Concentrated Liquid and a Method for Producing an Electrolyte Solution Using the Same (1) Regarding Solvent The nonaqueous organic solvent used is preferably a chain or cyclic carbonic acid ester compound or an ether compound having at least two oxygen atoms, which is high in chemical stability and in which solubility of lithium hexafluorophosphate is high. As such solvent, it is possible to mention chain carbonic acid ester compounds, such as dimethyl carbonate, diethyl carbonate, ethyl methyl carbonate, etc., cyclic carbonic acid ester compounds, such as ethylene carbonate, propylene carbonate, butylene carbonate, etc., chain ether compounds, such as γ-butyrolactone, γ-valerolactone, 1,2-dimethoxyethane, diethyl ether, etc., and cyclic ether compounds, such as tetrahydrofuran, 2-methyltetrahydrofuran, dioxane, etc. For reasons of high dielectric constant and high acid resistance, dimethyl carbonate, diethyl carbonate, ethyl methyl carbonate, ethylene carbonate, propylene carbonate, and 1,2-dimethoxyethane are preferable.

It is possible to use one kind or several kinds of the nonaqueous organic solvent in mixture.

(2) Regarding a Reaction of Phosphorus Trichloride, Chlorine and Lithium Chloride In the production method of the present invention, firstly phosphorus trichloride and lithium chloride as the raw materials are fed into a nonaqueous organic solvent, and, into this, chlorine gas is blown to conduct the reaction in the nonaqueous organic solvent. Then, hydrogen fluoride is introduced into the solvent containing the reaction product to conduct a reaction with the reaction product.

In the present invention, the molar proportion of lithium chloride, chlorine and phosphorus trichloride is 1-1.1:1:1-2. It is necessary to feed phosphorus trichloride in an amount equal to or more than that of chlorine gas. This is because impurities are generated by a reaction of excessive chlorine gas with the solvent when the amount of chlorine gas is more than that of phosphorus trichloride. Therefore, it is necessary to feed phosphorus trichloride in an amount ranging from one to two times by mol that of chlorine gas. The amount of lithium chloride is preferably 1 to 1.1 times, more preferably 1.0 to 1.1 times, by mol that of chlorine gas in terms of the cost of the raw materials.

Then, as to the amount of the raw material fed into the nonaqueous organic solvent, it is necessary to set lithium chloride at 400 g or less, preferably 150 g or less, relative to 1 liter of the nonaqueous organic solvent. If the amount of lithium chloride exceeds 400 g relative to 1 liter of the nonaqueous organic solvent, the product becomes saturated to generate the unreacted lithium chloride. This does not allow the reaction to proceed.

As to the temperature to conduct this reaction, the lower limit is −40° C., preferably 5° C., and the upper limit is 100° C., preferably 50° C. If the reaction temperature is lower than −40° C., the reaction does not proceed due to solidification of the nonaqueous organic solvent. In case that it is higher than 100° C., coloring and side reactions are caused. Therefore, it is not preferable.

The pressure during the reaction is not particularly limited. There is no gas component to be generated, and the reaction rapidly progresses 100% at atmospheric pressure. Therefore, a special pressure-proof reaction vessel is not necessary, and it is conducted basically at around atmospheric pressure.

If it is irradiated with light during the reaction, a reaction between the nonaqueous organic solvent and chlorine may occur. Therefore, it is preferable to conduct that under a shaded condition during the reaction.

On the other hand, after the completion of the chlorine gas blow, a lithium chloride powder fed into the reaction vessel is totally or partially dissolved by the following reaction formula [1] and becomes an intermediate compound that is assumed to be lithium hexachlorophosphate.

$$LiCl + PCl_3 + Cl_2 \rightarrow LiPCl_6 \qquad [1]$$

(3) Regarding Introduction of Hydrogen Fluoride

Next, in order to conduct a fluorination of the lithium hexachlorophosphate formed, anhydrous hydrogen fluoride is introduced into the reaction vessel. Upon this, the anhydrous hydrogen fluoride may be in the form of gas or liquid. The target product of lithium hexafluorophosphate is obtained by the following reaction formula [2].

$$LiPCl_6 + 6HF \rightarrow LiPF_6 + 6HCl \qquad [2]$$

It is necessary that the amount of anhydrous hydrogen fluoride to be introduced is at least 6.01 times by mol that of the total of lithium hexachlorophosphate as an intermediate and an excess of phosphorus trichloride. If the amount of anhydrous hydrogen fluoride is less than 6.01 times by mol, fluorination of lithium hexachlorophosphate does not progress sufficiently, and a partially fluorochlorinated lithium phosphate and phosphorus trichloride remain. With this, the chlorine concentration of the liquid increases, and as a result the acid impurity concentration also increases. Therefore, there is a risk to have an adverse effect on the lithium battery characteristics. If the amount of anhydrous hydrogen fluoride is at least 6.01 times by mol that of the total of lithium hexachlorophosphate and an excess of phosphorus trichloride, not only lithium hexachlorophosphate reacts completely into lithium hexafluorophosphate, but also an excess of phosphorus trichloride reacts into phosphorus trifluoride having a high vapor pressure. Therefore, it becomes possible to achieve an easy removal by a subsequent decompression treatment, etc. Therefore, it is necessary to introduce anhydrous hydrogen fluoride in an amount that is at least 6.01 times by mol that of the total of lithium hexachlorophosphate and an excess of phosphorus trichloride. From the viewpoint of the raw material cost, the amount of anhydrous hydrogen fluoride is preferably in a range of 6.01 to 7.20 times by mol that of the total of lithium hexachlorophosphate and an excess of phosphorus trichloride.

As to the temperature to conduct this reaction, the lower limit is −40° C., preferably 5° C., and the upper limit is 100° C., preferably 50° C. If the reaction temperature is lower than −40° C., the reaction does not proceed due to solidification of the nonaqueous organic solvent. In case that it is higher than 100° C., coloring and side reactions are caused. Therefore, it is not preferable due to lowering of yield and a resulting difficulty to adjust the concentration of acid impurities contained in the concentrated liquid to 60 mass ppm or less.

The pressure during this reaction is not particularly limited. In order to remove hydrogen chloride produced as a by-product, it is conducted generally at around atmospheric pressure.

(4) Regarding the Concentration by Degassing

A concentration by degassing is conducted for removing hydrogen chloride, phosphorus trifluoride and an excessively introduced portion of hydrogen fluoride, which are present in a filtrate obtained by filtrating a nonaqueous organic solution containing lithium hexafluorophosphate obtained by introducing anhydrous hydrogen fluoride.

The concentration by degassing makes it possible to increase the concentration of lithium hexafluorophosphate by decompressing a gas phase portion containing a volatile component from the solution or by allowing a carrier gas, such as nitrogen gas, dry air, etc., to flow therethrough to discharge the gas phase to the outside of the system.

For the decompression, it is possible to use a vacuum pump, aspirator, etc. The decompression is conducted by turning the reaction vessel to a sealed condition and then maintaining the inside of the system to have a pressure lower than atmospheric pressure. It is possible to conduct the concentration more efficiently when the pressure of the inside of the system is lower and when the temperature of the inside of the system is higher. If the temperature is too high, the concentrated liquid obtained may have coloring. Furthermore, yield may become low by the decomposition of lithium hexafluorophosphate. Therefore, the upper limit of the temperature is 90° C., preferably 60° C. If the temperature is too low, there is a possibility that the nonaqueous organic solvent solidifies. In case that it solidifies, it becomes difficult to remove acid impurities. Therefore, the lower limit of the temperature is −20° C., preferably 10° C. The pressure of the inside of the system varies depending on the temperature and the vapor pressure of the liquid to be concentrated. It depends on circumstances, but it is preferable to conduct the decompression to maintain the degree of vacuum within the vessel at 10 kPa or lower in terms of absolute pressure. If the pressure to be maintained exceeds 10 kPa, it is not possible to eliminate hydrogen chloride, hydrogen fluoride, etc. as impurities until they have desired concentrations or lower. Alternatively, it takes a long time to eliminate the impurities until they have desired concentrations or lower. Therefore, it is not preferable. If the pressure to be maintained is 5 kPa or lower, it is possible to eliminate the impurities until low concentrations. Therefore, it is more preferable. In the case of allowing the carrier gas to flow, it may be allowed to flow only through the gas phase portion. It is, however, more efficient to allow it to flow through the liquid, too, by bubbling or the like.

As to the temperature during the concentration by degassing, the lower limit is −20° C., preferably 10° C., and the upper limit is 90° C., preferably 60° C. If the temperature during the concentration by degassing is lower than −20° C., the nonaqueous organic solvent solidifies. Therefore, it is difficult to remove acid impurities. In case that it is higher than 90° C., coloring and side reactions are caused. As a result, it becomes difficult to adjust the concentration of acid impurities contained in the concentrated liquid to 60 mass ppm or less. Therefore, it is not preferable.

The degree of concentration depends on the initial concentration of lithium hexafluorophosphate, too. It is more preferable to have a higher concentration of lithium hexafluorophosphate after the concentration. It is necessary to conduct the concentration by degassing until the concentration of lithium hexafluorophosphate becomes 25 mass % or higher at lowest, preferably around 35 to 45 mass %. If it is made to be too high in concentration, lithium hexafluorophosphate is precipitated. If it is concentrated to have 50 mass % or higher, it becomes necessary to add the solvent again. Therefore, it is not preferable. In case that the degree of the concentration is low so that the concentration of lithium hexafluorophosphate after the concentration is less than 25 mass %, it is difficult to adjust the concentration of acid impurities contained in the concentrated liquid to 60 mass ppm or lower. Therefore, it is not preferable.

A high-purity, lithium hexafluorophosphate concentrated liquid obtained by the concentration by degassing after the synthesis can be used as a raw material of an electrolyte solution of lithium ion batteries. In the case of using it for lithium ion batteries, the concentrated liquid is subjected to at least one treatment selected from filtration, concentration, a dilution with a nonaqueous organic solvent, and the addition of an additive, thereby obtaining a lithium ion battery electrolyte solution, which is an electrolyte solution having desired concentration and construction. In the filtration, LiF and the like are removed by using a pressure filter, a vacuum filter or a filter press using a filter cloth or a cartridge filter, a sedimentation equipment by centrifugation, a filtration separator, a cross-flow filter using an ultrafiltration membrane, etc. It is optional to remove acid impurities, such as hydrogen fluoride, by passing the concentrated liquid through an ion exchange resin. The temperature at that time is preferably 15 to 50° C. for reasons of preventing the decomposition of $LiPF_6$, the solvent, and the ion exchange resin. It is more preferably 16 to 34° C. from the viewpoint of viscosity of the concentrated liquid to be passed through the ion exchange resin. As the ion exchange resin, it is possible to mention one having a base structure, such as styrene-divinylbenzene copolymers, styrene series, and acrylic series, and a functional group, such as —$SO_3H$, —$N(CH_3)_2$, —$N(X)(CH_3)_3$, and —$N(X)(C_2H_4OH)(CH_3)_2$. The X is a halide. The concentration is one to distill the solvent and the like out by the degassing under reduced pressure, etc. under a sealed condition to achieve an adjustment to a desired concentration. In the concentration, it is optional to remove acid impurities together with the solvent. The dilution with the nonaqueous organic solvent is one to conduct a dilution with a nonaqueous organic solvent, such as ethyl methyl carbonate, to achieve an adjustment to have a desired concentration. In the lithium ion battery electrolyte solution, an additive(s) may be contained.

It is also possible to obtain lithium hexafluorophosphate crystals from the thus obtained solution containing lithium hexafluorophosphate as an electrolyte by a crystallization process that is cooling or concentration. In the present invention, however, a solvent for lithium ion batteries is used as a nonaqueous organic solvent used in the reaction. Therefore, without taking lithium hexafluorophosphate as a solid out of the solution obtained by the reaction by the crystallization process, it is usable directly as a raw material of an electrolyte solution for lithium ion batteries.

2. Regarding Lithium Ion Battery

Next, construction of a lithium ion battery of the present invention is explained. A lithium ion battery of the present invention is characterized by using a lithium hexafluorophosphate concentrated liquid obtained by the above production method of the present invention or a lithium ion battery electrolyte solution containing lithium hexafluorophosphate as an electrolyte using the lithium hexafluorophosphate concentrated liquid. For other component members, those used in general lithium ion batteries are used. That is, it is composed of a cathode and an anode, which are capable of storing and releasing lithium, a separator, a container, etc.

The anode is equipped with at least an anode material and a current collector. The cathode is equipped with at least a cathode material and a current collector.

The current collector is a conductive sheet that exchanges electrons with a cathode material or an anode material. Metal, carbon material or conductive polymer can be used therefor. For example, an aluminum foil is used for the cathode, and a copper foil is used for the anode.

The anode material is not particularly limited. There is used a lithium metal, an alloy and an intermetallic compound between lithium and another metal, various carbon materials, artificial graphite, natural graphite, metal oxide, metal nitride, activated carbon or conductive polymer, etc., which can store and release lithium.

The cathode material is not particularly limited. For example, there is used a lithium-containing, transition metal complex oxide, such as $LiCoO_2$, $LiNiO_2$, $LiMnO_2$, or $LiMn_2O_4$, one in which a plurality of transition metals of those lithium-containing, transition metal complex oxides have been mixed, one in which a transition metal of those lithium-containing, transition metal complex oxides has partially been replaced with another metal, a lithium-containing, transition metal phosphate, such as $LiFePO_4$ or $LiMnPO_4$, one in which a plurality of transition metals of those lithium-containing, transition metal phosphates have been mixed, one in which a transition metal of those lithium-containing, transition metal phosphates has partially been replaced with another metal, an oxide, such as $TiO_2$, $V_2O_5$, or $MoO_3$, a sulfide, such as $TiS_2$ or FeS, or a conductive polymer, such as polyacetylene, polyparaphenylene, polyaniline, and polypyrrole, activated carbon, a polymer that generates radicals, or a carbon material, etc.

By adding acetylene black, ketjen black, carbon fiber or graphite as a conductive material, and polytetrafluoroethylene, polyvinylidene fluoride or SBR resin as a binding agent, etc. to the cathode material or anode material, it can easily be formed into a sheet.

As a separator for preventing a contact between the cathode and the anode, there is used a nonwoven fabric or porous sheet made of polypropylene, polyethylene, paper or glass fiber.

From each component mentioned above, there is assembled a lithium ion battery having a coin-like, cylindrical, rectangular, or aluminum laminated sheet-like shape.

In the following, the present invention is specifically explained by examples, but the present invention is not limited by such examples.

EXAMPLES

Example 1

Under atmospheric pressure, a polytetrafluoroethylene reaction vessel was charged with 500 g of ethyl methyl carbonate (in the following, it may be mentioned as EMC), 72 g of phosphorus trichloride (in the following, it may be mentioned as $PCl_3$), and 21 g of lithium chloride (in the following, it may be mentioned as LiCl), followed by dispersion by stirring. At this time, one subjected to a shading treatment was used as the polytetrafluoroethylene reaction vessel. While maintaining this dispersion liquid at 10° C., 35.5 g of chlorine gas (in the following, it may be mentioned as $Cl_2$) was introduced. In the liquid after completing the introduction, solid matter was dissolved, resulting in a pale yellow color solution. By the progress of the reaction, lithium hexachlorophosphate was generated. Into the obtained solution, 66 g of anhydrous hydrogen fluoride was introduced, while maintaining at 10° C. The liquid after completing the introduction changed from the pale yellow color to colorless, and lithium hexafluorophosphate (in the following, it may be mentioned as $LiPF_6$) was generated. The obtained reaction solution was filtered by a cross-flow filter to separate lithium fluoride as the residue and the filtrate.

As a result of analyzing the obtained filtrate by NMR, the ethyl methyl carbonate's decomposition and the like were not found, and the product was only lithium hexafluorophosphate. Furthermore, the amount of lithium hexafluorophosphate in the filtrate, which was determined by NMR, was 75 g, and it was confirmed that yield was almost 100%. The concentration of acid impurities causing adverse effects on lithium battery characteristics was 15000 mass ppm.

Next, after turning the reaction vessel into a sealed condition, while the filtrate was heated at 50° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 37 mass % by the above-mentioned operation of the concentration by degassing, the concentration of acid impurities was 50 mass ppm. As a result of analyzing the obtained concentrated liquid by NMR, the ethyl methyl carbonate's decomposition and the like were not found. The results are shown in Table 1.

TABLE 1

|  | Synthesis of intermediate ($LiPCl_6$) | | | | Fluorination | |
|---|---|---|---|---|---|---|
|  | $PCl_3:Cl_2:LiCl$ [molar ratio] | LiCl/solvent [g/L] | Solvent | Temp. [° C.] | Amount of anhydrous HF added | Temp. [° C.] |
| Ex. 1 | 72 g:35.5 g:21 g 1.06:1:1 | 21 g/500 g 42 | EMC | 10 | 66 g (6.2 times by mol $LiPCl_6$ + $PCl_3$) | 10 |
| Ex. 2 | 144 g:71 g:42 g 1.06:1:1 | 42 g/500 g 85 | EMC | 10 | 132 g (6.2 times by mol $LiPCl_6$ + $PCl_3$) | 10 |
| Ex. 3 | 144 g:71 g:42 g 1.06:1:1 | 42 g/500 g 90 | DMC | 10 | 132 g (6.2 times by mol $LiPCl_6$ + $PCl_3$) | 10 |
| Ex. 4 | 144 g:71 g:42 g 1.06:1:1 | 42 g/500 g 81 | DEC | 10 | 132 g (6.2 times by mol $LiPCl_6$ + $PCl_3$) | 10 |
| Ex. 5 | 144 g:71 g:42 g 1.06:1:1 | 42 g/500 g 87 | DMC + DEC (300 g + 200 g) | 10 | 132 g (6.2 times by mol $LiPCl_6$ + $PCl_3$) | 10 |
| Ex. 6 | 144 g:71 g:42 g 1.06:1:1 | 42 g/500 g 73 | 1,2-dimethoxyethane | 10 | 132 g (6.2 times by mol $LiPCl_6$ + $PCl_3$) | 10 |
| Ex. 7 | 144 g:71 g:42 g 1.06:1:1 | 42 g/500 g 85 | EMC | 10 | 132 g (6.2 times by mol $LiPCl_6$ + $PCl_3$) | 10 |
| Ex. 8 | 288 g:142 g:84 g 1.06:1:1 | 84 g/1000 g 85 | EMC | 10 | 264 g (6.2 times by mol $LiPCl_6$ + $PCl_3$) | 10 |
| Ex. 9 | 1441 g:710 g:424 g 1.05:1:1 | 424 g/5000 g 86 | EMC | 10 | 1320 g (6.3 times by mol $LiPCl_6$ + $PCl_3$) | 10 |

TABLE 1-continued

| | Prior to concentration by degassing | | Concentration by degassing | | | |
|---|---|---|---|---|---|---|
| | | | Degassing under reduced pressure | | Concentrated liquid | |
| | | Acid | | | | Acid |
| | | impurity | | | | impurity |
| | | conc. in | | Pressure | | conc. |
| | | filtrate | | (Absolute | LiPF$_6$ | |
| | Yield | [mass | Temp. | pressure upon | conc. | [mass |
| | [%] | ppm] | [° C.] | Means | decompression release) | [mass %] | ppm] |
| Ex. 1 | 100 | 15000 | 50 | Vacuum pump | Lower than atmospheric pressure (≤1 kPa) | 37 | 50 |
| Ex. 2 | 100 | 15000 | 50 | Vacuum pump | Lower than atmospheric pressure (≤1 kPa) | 37 | 50 |
| Ex. 3 | 100 | 18600 | 40 | Vacuum pump | Lower than atmospheric pressure (≤1 kPa) | 42 | 50 |
| Ex. 4 | 100 | 8000 | 60 | Vacuum pump | Lower than atmospheric pressure (≤1 kPa) | 38 | 60 |
| Ex. 5 | 100 | 14000 | 50 | Vacuum pump | Lower than atmospheric pressure (≤1 kPa) | 40 | 60 |
| Ex. 6 | 100 | 7500 | 50 | Vacuum pump | Lower than atmospheric pressure (≤1 kPa) | 44 | 40 |
| Ex. 7 | 100 | 15000 | 50 | Vacuum pump | Lower than atmospheric pressure (≤1 kPa) | 25 | 58 |
| Ex. 8 | 100 | 12000 | 40 | Dry vacuum pump | Lower than atmospheric pressure (≤1 kPa) | 40 | 40 |
| Ex. 9 | 100 | 7000 | 40 | Vacuum pump | Lower than atmospheric pressure (≤1 kPa) | 42 | 40 |

Examples 2-9

Lithium hexafluorophosphate concentrated liquids were prepared by procedures similar to that of Example 1 except that the solvent and its amount, the amounts of phosphorus trichloride, lithium chloride, chlorine gas and anhydrous hydrogen fluoride, the temperature and the means of the concentration by degassing, and the concentration of lithium hexafluorophosphate after the concentration by degassing, which had been used in Example 1, were changed. In any of the above examples, the product was only lithium hexafluorophosphate, and the solvent's decomposition and the like were not found in the obtained solution. The results are shown in Table 1.

In Table, DMC means dimethyl carbonate, DEC means diethyl carbonate, and "DMC+DEC (300 g+200 g)" means a mixed solvent of 300 g DMC and 200 g DEC. Furthermore, in Example 9, a SUS reaction vessel with a PFA coating was used as the reaction vessel.

Example 10

The concentrated liquid obtained by Example 5 was filtered by using a cartridge filter. By using the obtained filtrate, a test cell was prepared. Its performance as an electrolyte solution was evaluated by a charge-discharge test. Firstly, to a lithium hexafluorophosphate/(a mixed solvent of dimethyl carbonate and diethyl carbonate) solution as the filtrate obtained by the filtration, dimethyl carbonate, diethyl carbonate and ethylene carbonate were added to achieve dimethyl carbonate:diethyl carbonate:ethylene carbonate=1:1:1 by volume ratio, thereby preparing 1 mol/L lithium hexafluorophosphate/(a mixed solvent of dimethyl carbonate, diethyl carbonate and ethylene carbonate) electrolyte solution.

Using this electrolyte solution, there was constructed a test cell using graphite as the anode and lithium cobalt oxide as the cathode. Specifically, 5 parts by mass of polyvinylidene fluoride (PVDF) was mixed with 95 parts by mass of natural graphite powder, followed by adding N,N-dimethylformamide to make a slurry. This slurry was applied onto a nickel mesh, followed by drying at 150° C. for 12 hours to make a test anode body. Furthermore, 10 parts by mass of graphite powder and 5 parts by mass of PVDF were mixed with 85 parts by mass of lithium cobalt oxide, followed by adding N,N-dimethylformamide to make a slurry. This slurry was applied onto an aluminum foil, followed by drying at 150° C. for 12 hours to make a test cathode body.

A test cell was constructed by using a polypropylene nonwoven fabric as the separator, an electrolyte solution using the solution obtained by the above concentration by degassing, and the above anode body and cathode body. Then, a constant current, charge and discharge test was conducted at 0.35 mA/cm² for both charge and discharge by repeating a cycle of the charge until 4.2V and the discharge until 2.5V to observe the change of the capacity retention.

As a result, the charge and discharge efficiency was almost 100%, and the capacity retention after 100 cycles did not change at all.

Example 11

The concentrated liquid obtained by Example 9 was filtered by using a cartridge filter. By using the obtained filtrate, a test cell was prepared. Its performance as an electrolyte solution was evaluated by a charge-discharge test. Firstly, the lithium hexafluorophosphate/ethyl methyl carbonate solution as the filtrate obtained by the filtration was concentrated by a factor of about two, followed by adding thereto ethylene carbonate to achieve ethyl methyl carbonate:ethylene carbonate=2:1 by volume ratio, thereby preparing 1 mol/L lithium hexafluorophosphate/(a mixed solvent of ethyl methyl carbonate and ethylene carbonate) electrolyte solution.

Using this electrolyte solution, there was constructed a test cell using graphite as the anode and lithium cobalt oxide as the cathode. Specifically, 5 parts by mass of polyvinylidene fluoride (PVDF) was mixed with 95 parts by mass of natural graphite powder, followed by adding N,N-dimethylformamide to make a slurry. This slurry was applied onto a nickel mesh, followed by drying at 150° C. for 12 hours to make a test anode body. Furthermore, 10 parts by mass of graphite powder and 5 parts by mass of PVDF were mixed with 85 parts by mass of lithium cobalt oxide, followed by adding N,N-dimethylformamide to make a slurry. This slurry was applied onto an aluminum foil, followed by drying at 150° C. for 12 hours to make a test cathode body.

A test cell was constructed by using a polypropylene nonwoven fabric as the separator, an electrolyte solution using the solution obtained by the above concentration by degassing, and the above anode body and cathode body. Then, a constant current, charge and discharge test was conducted at 0.35 mA/cm² for both charge and discharge by repeating a cycle of the charge until 4.2V and the discharge until 2.5V to observe the change of the capacity retention.

As a result, the charge and discharge efficiency was almost 100%, and the capacity retention after 100 cycles did not change at all.

Example 12

Under atmospheric pressure, a polytetrafluoroethylene reaction vessel was charged with 500 g of ethyl methyl carbonate, 144 g of phosphorus trichloride, 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 110° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the ethyl methyl carbonate's decomposition and the like were not found, and the product was only lithium hexafluorophosphate. Furthermore, the amount of lithium hexafluorophosphate in the filtrate, which was determined by NMR, was 90 g, and it was confirmed that yield was almost 60%. The concentration of acid impurities causing adverse effects on lithium battery characteristics was 16000 mass ppm.

Next, after turning the reaction vessel into a sealed condition, while the filtrate was heated at 50° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 37 mass % by the above-mentioned operation of the concentration by degassing, the concentration of acid impurities was 100 mass ppm. As a result of analyzing the obtained concentrated liquid by NMR, the ethyl methyl carbonate's decomposition and the like were not found. The results are shown in Table 2.

TABLE 2

| | Synthesis of intermediate (LiPCl$_6$) | | | | Fluorination | |
| --- | --- | --- | --- | --- | --- | --- |
| | PCl$_3$:Cl$_2$:LiCl [molar ratio] | LiCl/solvent [g/L] | Solvent | Temp. [° C.] | Amount of anhydrous HF added | Temp. [° C.] |
| Ex. 12 | 144 g:71 g:42 g 1.06:1:1 | 42 g/500 g 85 | EMC | 10 | 132 g (6.2 times by mol LiPCl$_6$ + PCl$_3$) | 110 |
| Ex. 13 | 144 g:71 g:42 g 1.06:1:1 | 42 g/500 g 102 | PC | 10 | 132 g (6.2 times by mol LiPCl$_6$ + PCl$_3$) | 10 |
| Ex. 14 | 144 g:71 g:42 g 1.06:1:1 | 42 g/500 g 87 | EC | 40 | 132 g (6.2 times by mol LiPCl$_6$ + PCl$_3$) | 40 |
| Ex. 15 | 144 g:71 g:42 g 1.06:1:1 | 42 g/500 g 85 | EMC | 10 | 132 g (6.2 times by mol LiPCl$_6$ + PCl$_3$) | 10 |
| Ex. 16 | 144 g:71 g:42 g 1.06:1:1 | 42 g/500 g 73 | EMC | 10 | 132 g (6.2 times by mol LiPCl$_6$ + PCl$_3$) | 10 |

TABLE 2-continued

| | | | | | | |
|---|---|---|---|---|---|---|
| Ex. 17 | 144 g:71 g:42 g 1.06:1:1 | 42 g/500 g 85 | EMC | 10 | 106 g (5 times by mol LiPCl$_6$ + PCl$_3$) | 10 |
| Ref. Ex. 1 | 144 g:71 g:42 g 1.06:1:1 | 42 g/500 g 85 | EMC | 10 | 132 g (6.2 times by mol LiPCl$_6$ + PCl$_3$) | 10 |

| | Prior to concentration by degassing | | Concentration by degassing | | Concentrated liquid | |
|---|---|---|---|---|---|---|
| | Yield [%] | Acid impurity conc. in filtrate [mass ppm] | Degassing under reduced pressure | | | |
| | | | Temp. [° C.] | Means | Pressure (Absolute pressure upon decompression release) | LiPF$_6$ conc. [mass %] | Acid impurity conc. [mass ppm] |
| Ex. 12 | 60 | 16000 | 50 | Vacuum pump | Lower than atmospheric pressure (≤1 kPa) | 37 | 100 |
| Ex. 13 | 100 | 25000 | 60 | Vacuum pump | Lower than atmospheric pressure (≤1 kPa) | 55 | 50 LiPF$_6$ was precipitated. |
| Ex. 14 | 100 | 25000 | 60 | Vacuum pump | Lower than atmospheric pressure (≤1 kPa) | 55 | 50 LiPF$_6$ was precipitated. |
| Ex. 15 | 100 | 15000 | 100 | Vacuum pump | Lower than atmospheric pressure (≤1 kPa) | 37 | 100 Yield of LiPF$_6$ lowered. LiPF$_6$ decomposition product occurred. |
| Ex. 16 | 100 | 15000 | 0 | Vacuum pump | Lower than atmospheric pressure (≤1 kPa) | 37 | 80 100 hr was necessary for concentration. |
| Ex. 17 | 50 | 30000 | 50 | Vacuum pump | Lower than atmospheric pressure (≤1 kPa) | 37 | 10000 |
| Ref Ex. 1 | 100 | 12000 | LiCl re-addition → decompression treatment → pressure filtration, without conducting concentration by degassing | | | | 15 |

Example 13

Under atmospheric pressure, a polytetrafluoroethylene reaction vessel was charged with 500 g of propylene carbonate (in the following, it may be mentioned as PC), 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 10° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the propylene carbonate's decomposition and the like were not found, and the product was only lithium hexafluorophosphate. Furthermore, the amount of lithium hexafluorophosphate in the filtrate, which was determined by NMR, was 150 g, and it was confirmed that yield was almost 100%. The concentration of acid impurities causing adverse effects on lithium battery characteristics was 25000 mass ppm.

Next, after turning the reaction vessel into a sealed condition, while the filtrate was heated at 60° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 55 mass % by the above-mentioned operation of the concentration by degassing, the precipitation of lithium hexafluorophosphate was found. The concentration of acid impurities was 50 mass ppm. As a result of analyzing the obtained concentrated liquid by NMR, the propylene carbonate's decomposition and the like were not found. The results are shown in Table 2.

Example 14

Under atmospheric pressure, a polytetrafluoroethylene reaction vessel was charged with 500 g of ethylene carbonate (in the following, it may be mentioned as EC), 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 40° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 40° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the ethylene carbonate's decomposition and the like were not found, and the product was only lithium hexafluorophosphate. Furthermore, the amount of lithium hexafluorophosphate in the filtrate, which was determined by NMR, was 150 g, and it was confirmed that yield was almost 100%. The concentration of acid impurities causing adverse effects on lithium battery characteristics was 25000 mass ppm.

Next, after turning the reaction vessel into a sealed condition, while the filtrate was heated at 60° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 55 mass % by the above-mentioned operation of the concentration by degassing, the precipitation of lithium hexafluorophosphate was found. The concentration of acid impurities was 50 mass ppm. As a result of analyzing the obtained concentrated liquid by NMR, the ethylene carbonate's decomposition and the like were not found. The results are shown in Table 2.

Example 15

Under atmospheric pressure, a polytetrafluoroethylene reaction vessel was charged with 500 g of ethyl methyl carbonate, 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 10° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the ethyl methyl carbonate's decomposition and the like were not found, and the product was only lithium hexafluorophosphate. Furthermore, the amount of lithium hexafluorophosphate in the filtrate, which was determined by NMR, was 150 g, and it was confirmed that yield was almost 100%. The concentration of acid impurities causing adverse effects on lithium battery characteristics was 15000 mass ppm.

Next, after turning the reaction vessel into a sealed condition, while the filtrate was heated at 100° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 37 mass % by the above-mentioned operation of the concentration by degassing, the concentration of acid impurities was 100 mass ppm. As a result of analyzing the obtained concentrated liquid by NMR, the ethyl methyl carbonate's decomposition and the like were not found. The amount of lithium hexafluorophosphate, however, decreased to 80 g, and there were observed impurity peaks considered to be of decomposition products of lithium hexafluorophosphate. The results are shown in Table 2.

Example 16

Under atmospheric pressure, a polytetrafluoroethylene reaction vessel was charged with 500 g of ethyl methyl carbonate, 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 10° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the ethyl methyl carbonate's decomposition and the like were not found, and the product was only lithium hexafluorophosphate. Furthermore, the amount of lithium hexafluorophosphate in the filtrate, which was determined by NMR, was 150 g, and it was confirmed that yield was almost 100%. The concentration of acid impurities causing adverse effects on lithium battery characteristics was 15000 mass ppm.

Next, after turning the reaction vessel into a sealed condition, while the filtrate was cooled at 0° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 37 mass % by the above-mentioned operation of the concentration by degassing, it was necessary to spend 100 hours as the concentration time. The concentration of acid impurities was 80 mass ppm. As a result of analyzing the obtained concentrated liquid by NMR, the ethyl methyl carbonate's decomposition and the like were not found. The results are shown in Table 2.

Example 17

Under atmospheric pressure, a polytetrafluoroethylene reaction vessel was charged with 500 g of ethyl methyl carbonate, 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 106 g of anhydrous hydrogen fluoride was introduced, while maintaining at 10° C. The liquid after completing the introduction changed from the pale yellow color to colorless, and lithium hexafluorophosphate was generated. The obtained reaction solution was filtered by a cross-flow filter to separate lithium fluoride as the residue and the filtrate.

As a result of analyzing the obtained filtrate by NMR, the ethyl methyl carbonate's decomposition and the like were not found, and the product was only lithium hexafluorophosphate. Furthermore, the amount of lithium hexafluorophosphate in the filtrate, which was determined by NMR, was 75 g, and it was confirmed that yield was almost 50%. The concentration of acid impurities causing adverse effects on lithium battery characteristics was 30000 mass ppm.

Next, after turning the reaction vessel into a sealed condition, while the filtrate was heated at 50° C., degassing was started by using a vacuum pump. In the operation of this concentration by degassing, it was confirmed that the pressure of the inside of the reaction vessel was maintained at a pressure lower than atmospheric pressure, and it was confirmed that the degree of vacuum of the inside of the reaction vessel at the time of releasing decompression was 1 kPa or lower in absolute pressure. As a result of concentration until the lithium hexafluorophosphate concentration became 37 mass % by the above-mentioned operation of the concentration by degassing, the concentration of acid impurities was 10000 mass ppm. As a result of analyzing the obtained concentrated liquid by NMR, the ethyl methyl carbonate's decomposition and the like were not found. The results are shown in Table 2.

Reference Example 1

Under atmospheric pressure, a polytetrafluoroethylene reaction vessel was charged with 500 g of ethyl methyl carbonate, 144 g of phosphorus trichloride, and 42 g of lithium chloride, followed by dispersion by stirring. At this time, one subjected to a shading treatment was used as the polytetrafluoroethylene reaction vessel. While maintaining this dispersion liquid at 10° C., 71 g of chlorine gas was introduced. In the liquid after completing the introduction, solid matter was dissolved, resulting in a pale yellow color solution. By the progress of the reaction, lithium hexachlorophosphate was generated. Into the obtained solution, 132 g of anhydrous hydrogen fluoride was introduced, while maintaining at 10° C. The liquid after completing the introduction changed from the pale yellow color to colorless, and lithium hexafluorophosphate was generated. The concentration of acid impurities causing adverse effects on lithium battery characteristics was 12000 mass ppm.

Then, hydrogen fluoride as an acid impurity in the obtained solution was converted to hydrogen chloride and lithium fluoride by adding 42 g of lithium chloride again, and they were removed by a decompression treatment together with hydrogen chloride and phosphorus trifluoride as by-products during the reaction. As a result of analyzing the obtained solution by NMR, the ethyl methyl carbonate's decomposition and the like were not found, and the product was only lithium hexafluorophosphate. The amount of lithium hexafluorophosphate in the solution determined by NMR was 150 g, and it was confirmed that yield was almost 100%. Since the LiF formed and the unreacted lithium chloride remained in the obtained solution, a pressure filtration was conducted for filtration. With this, the concentration of acid impurities in the filtrate causing adverse effects on lithium battery characteristics was 15 mass ppm. The results are shown in Table 2.

Reference Example 2

The solution obtained by Reference Example 1 was filtered. By using the obtained filtrate, a test cell was prepared. Its performance as an electrolyte solution was evaluated by a charge-discharge test. Firstly, the lithium hexafluorophosphate/ethyl methyl carbonate solution as the filtrate obtained by the filtration was concentrated by a factor of about two, followed by adding thereto ethylene carbonate to achieve ethyl methyl carbonate:ethylene carbonate=2:1 by volume ratio, thereby preparing 1 mol/L lithium hexafluorophosphate/(a mixed solvent of ethyl methyl carbonate and ethylene carbonate) electrolyte solution.

Using this electrolyte solution, there was constructed a test cell using graphite as the anode and lithium cobalt oxide as the cathode. Specifically, 5 parts by mass of polyvinylidene fluoride (PVDF) was mixed with 95 parts by mass of natural graphite powder, followed by adding N,N-dimethylformamide to make a slurry. This slurry was applied onto a nickel mesh, followed by drying at 150° C. for 12 hours to make a test anode body. Furthermore, 10 parts by mass of graphite powder and 5 parts by mass of PVDF were mixed with 85 parts by mass of lithium cobalt oxide, followed by adding N,N-dimethylformamide to make a slurry. This slurry was applied onto an aluminum foil, followed by drying at 150° C. for 12 hours to make a test cathode body. A test cell was constructed by using a polypropylene nonwoven fabric as the separator, an electrolyte solution prepared by the above, and the above anode body and cathode body. Then, a constant current, charge and discharge test was conducted at 0.35 mA/cm$^2$ for both charge and discharge by repeating a cycle of the charge until 4.2V and the discharge until 2.5V to observe the change of the capacity retention. As a result, the charge and discharge efficiency was almost 100%, and the capacity retention after 100 cycles did not change at all.

Hitherto, in a method for producing lithium hexafluorophosphate by reacting phosphorus trichloride, chlorine and lithium chloride in a nonaqueous organic solvent and then reacting the reaction product formed in the solvent with hydrogen fluoride, it has been conducted to remove the unreacted hydrogen fluoride by adding lithium chloride again in order to obtain a higher purity, electrolyte solution for lithium ion batteries. As mentioned in the above Examples, however, it is easily possible to obtain a high-purity, lithium hexafluorophosphate concentrated solution similar to that of Reference Example 1 as a conventional example, obtain a high-purity, electrolyte solution for lithium ion batteries, and obtain a lithium ion battery having similar battery performances, too, by conducting a concentration by degassing without adding lithium chloride again.

The invention claimed is:
1. A method for producing a lithium hexafluorophosphate concentrated liquid, comprising the steps of:
   (a) reacting together phosphorus trichloride, chlorine and lithium chloride in a nonaqueous organic solvent;

(b) reacting a reaction product of step (a), which has been formed in the solvent, with hydrogen fluoride to produce a reaction product containing lithium hexafluorophosphate;

(c) conducting a filtration of the reaction product of step (b) to obtain a filtrate;

(d) subjecting the filtrate to a concentration by degassing until concentration of the lithium hexafluorophosphate becomes 25 mass % or higher and lower than 50 mass %, wherein lithium chloride is not re-introduced after step (b).

2. The method for producing a lithium hexafluorophosphate concentrated liquid as claimed in claim 1, wherein step (d) is conducted by a degassing under reduced pressure.

3. The method for producing a lithium hexafluorophosphate concentrated liquid as claimed in claim 1, wherein the nonaqueous organic solvent used in step (a) is a chain or cyclic carbonic acid ester, or an ether compound having at least two oxygen atoms.

4. The method for producing a lithium hexafluorophosphate concentrated liquid as claimed in claim 3, wherein the carbonic acid ester is at least one selected from the group consisting of dimethyl carbonate, diethyl carbonate, ethyl methyl carbonate, ethylene carbonate, and propylene carbonate.

5. The method for producing a lithium hexafluorophosphate concentrated liquid as claimed in claim 3, wherein the ether compound is 1,2-dimethoxyethane.

6. The method for producing a lithium hexafluorophosphate concentrated liquid as claimed in claim 1, wherein step (d) is conducted until concentration of the lithium hexafluorophosphate becomes 25-45 mass %.

7. The method for producing a lithium hexafluorophosphate concentrated liquid as claimed in claim 1, wherein step (d) is conducted until concentration of the lithium hexafluorophosphate becomes 35-45 mass %.

8. A method for producing an electrolyte solution for lithium ion batteries, containing lithium hexafluorophosphate as an electrolyte, the method comprising the steps of:

(a) reacting together phosphorus trichloride, chlorine and lithium chloride in a nonaqueous organic solvent;

(b) reacting a reaction product of step (a), which has been formed in the solvent, with hydrogen fluoride to produce a reaction product containing lithium hexafluorophosphate;

(c) conducting a filtration of the reaction product of step (b) to obtain a filtrate;

(d) subjecting the filtrate to a concentration by degassing until concentration of the lithium hexafluorophosphate becomes 25 mass % or higher and lower than 50 mass %

(e) subjecting a lithium hexafluorophosphate concentrated liquid obtained by step (d) to at least one treatment selected from the group consisting of filtration, concentration, a dilution with a nonaqueous organic solvent, and addition of an additive, wherein the additive is not lithium chloride, and
wherein lithium chloride is not re-introduced after step (b).

* * * * *